(12) United States Patent
Kanner et al.

(10) Patent No.: US 9,390,385 B2
(45) Date of Patent: Jul. 12, 2016

(54) GUIDEWAY-GUIDED VEHICLE DETECTION BASED ON RFID SYSTEM

(71) Applicants: Abe Kanner, Mississauga (CA); Boyd McKillican, Vaughan (CA); Cameron Fraser, Vaughan (CA)

(72) Inventors: Abe Kanner, Mississauga (CA); Boyd McKillican, Vaughan (CA); Cameron Fraser, Vaughan (CA)

(73) Assignee: Thales Canada Inc, Toronto, Ontario (CA)

( * ) Notice: Subject to any disclaimer, the term of this patent is extended or adjusted under 35 U.S.C. 154(b) by 564 days.

(21) Appl. No.: 13/754,363

(22) Filed: Jan. 30, 2013

(65) Prior Publication Data

US 2014/0210595 A1    Jul. 31, 2014

(51) Int. Cl.
| | |
|---|---|
| H04Q 5/22 | (2006.01) |
| G06Q 10/00 | (2012.01) |
| B61L 1/16 | (2006.01) |
| B61L 3/12 | (2006.01) |
| B61L 25/04 | (2006.01) |

(52) U.S. Cl.
CPC ............... *G06Q 10/00* (2013.01); *B61L 1/165* (2013.01); *B61L 3/125* (2013.01); *B61L 25/048* (2013.01)

(58) Field of Classification Search
None
See application file for complete search history.

(56) References Cited

U.S. PATENT DOCUMENTS

| | | | |
|---|---|---|---|
| 7,826,938 B2 | 11/2010 | Kato et al. | |
| 7,954,770 B2 | 6/2011 | Tomlinson, Jr. et al. | |
| 8,140,250 B2 | 3/2012 | Mian et al. | |
| 2005/0205719 A1 | 9/2005 | Hendrickson et al. | |
| 2008/0055043 A1 | 3/2008 | Webb et al. | |
| 2009/0055043 A1* | 2/2009 | Mian et al. | 701/29 |
| 2009/0231097 A1 | 9/2009 | Brand | |
| 2011/0006912 A1 | 1/2011 | Sheardown et al. | |

FOREIGN PATENT DOCUMENTS

| | | |
|---|---|---|
| JP | 3246924 | 1/2002 |
| JP | 4752018 | 8/2011 |

OTHER PUBLICATIONS

US Dept. of Transportation, "Radio Frequency Identification to Track Freight Car Truck Components at the Facility for Accelerated Service Testing," Sep. 2009.
Amanna, Ashwin, et al., "Active RFID for Enhanced Railway Operations," Oct. 13, 2010.
International Search Report for corresponding International PCT Application No. PCT/IB2014/058529, dated Sep. 18, 2014.

* cited by examiner

*Primary Examiner* — Ojiako Nwugo
(74) *Attorney, Agent, or Firm* — Hauptman Ham, LLP (57) ABSTRACT

An apparatus for detecting the information about a guideway-guided vehicle having a masking component, the guideway-guided vehicle configured to follow a path of a guideway, comprising a radio frequency identification (RFID) system, method of making, and use thereof are disclosed. The RFID system comprises a first RFID transponder for transmitting, across the path, first RFID transponder specific information. An RFID reader comprises a first antenna for receiving the first RFID transponder specific information. The first RFID transponder and the first antenna are fixed relative to the path and on opposite sides of the path. The RFID reader is configured to substantially continuously monitor the first transponder specific information. The presence of the masking component of the guideway-guided vehicle between the first RFID transponder and the first antenna masks the substantially continuous monitoring of the first RFID transponder specific information.

17 Claims, 7 Drawing Sheets

GUIDEWAY-GUIDED VEHICLE DETECTION BASED ON RFID SYSTEM

BACKGROUND

Detecting trains via an independent detection system uses axle counters and/or track circuits. Detection by track circuits and axle counters are based on the principle that allows detection of trains equipped with steel wheels on steel rails. Track circuits operate when a voltage running through the steel rail energizes a track relay. Track circuits detect trains when the train axles shunt the rail voltage away from the relay, causing the relay to drop and indicating an occupied section of a guideway. Axle counters detect the passing of wheel flange by the detection head counting individual wheel axles entering into the occupied block section. For train systems where the trains do not have a steel wheel to steel rail interface (rubber tire systems, monorails, Maglev, and the like), conventional train detection systems like track circuits and axle counters are unreliable or even impossible to apply.

As an alternate to track circuits and axle counters, sometimes train mounted RFID transponders and a wayside reader are used to identify the passage of a train by reading the identifying information of a train mounted transponder. The wayside reader evaluates the passing transponder message to determine a train's movements on the guideway.

For train systems where the trains do not have a steel wheel to steel rail interface (e.g., rubber tire systems, monorails, Maglev, and the like), conventional train detection systems like track circuits and axle counters are hard or impossible to apply.

A disadvantage of the existing systems (track circuits and axle counters) is that they are connected to the rail in order to provide detection. This feature makes them susceptible to electromagnetic interference (EMI) induced into the rail. In particular, the risk for damage due to lightning strike which can cause unreliable operation and downstream equipment damage due to surge propagation of energy along the rail into galvanically coupled equipment.

Systems based on detection of transponders mounted on the train and wayside readers have the disadvantage that failure of the reader or the transponder can become dormant and hard to detect (unless special precautions are put into place) and as such might affect the safety of the system (not failsafe).

BRIEF DESCRIPTION OF THE DRAWINGS

The accompanying drawings, which are incorporated in and constitute a part of this specification, illustrate several embodiments and together with the description, serve to explain one or more the principles of the invention.

DESCRIPTION OF EMBODIMENTS

Reference will now be made in detail to embodiments of the invention, examples of which are illustrated in the accompanying drawings. Wherever possible, the same reference numbers will be used throughout the drawings to refer to the same or like parts.

Figure 1:
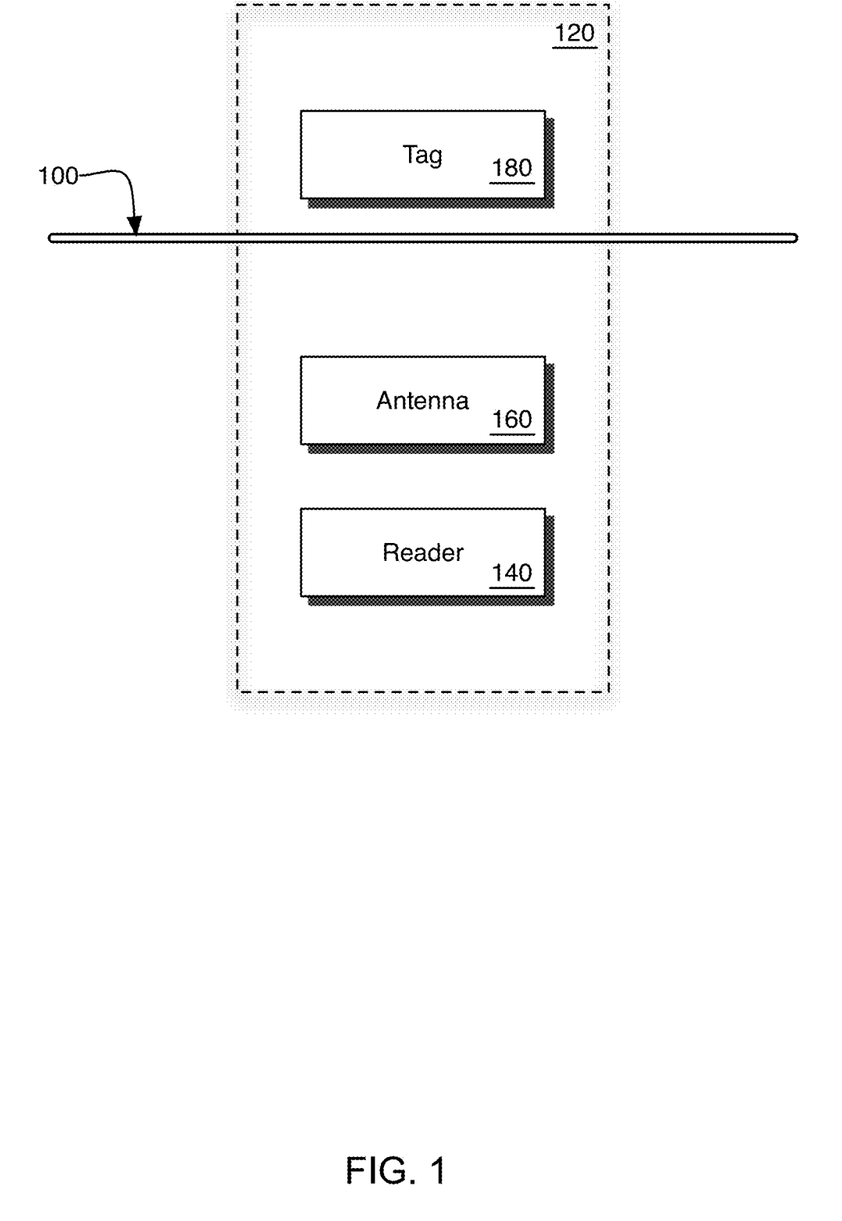
FIG. 1 is a top view of an apparatus for detecting the information about a guideway-guided vehicle.

In some embodiments, the invention is illustratable by reference to FIG. 1, which depicts an apparatus for detecting the information about a guideway-guided vehicle having a masking component. A guideway 100 separates some of the components of the radio frequency identification (RFID) system 120. In some embodiments, the guideway 100 does not separate the components of the RFID system 120.

The guideway 100 defines a path of the guideway-guided vehicle (not shown). Although a single guideway is shown, in some embodiments, two or more guideways 100 facilitate transportation of the guideway-guided vehicle. In some embodiments, the guideway is a rail or a groove. In some embodiments, the guideway 100 is load bearing. In some embodiments, the guideway comprises iron, steel, or a material suitable for supporting a maglev or other guideway-guided vehicle. In some embodiments, the guideway 100 has a guideway classification (weight) ranging from 35 to 80 kilograms/meter (kg/m) or from 40 to 60 kg/m or from 55 to 70 kg/m.

The RFID system 120 comprises a reader 140 having a first antenna 160. In some embodiments, the reader 140 is connected with the first antenna 160. In some embodiments, the reader 140 is in communication with the first antenna 160. A first RFID transponder 180 transmits, across the path, first RFID transponder specific information, which is receivable by the first antenna 160. Suitable RFID systems 120 and component parts thereof are available from various vendors.

The RFID transponder 180 is selected from passive RFID transponders, active RFID transponders, and battery assisted passive RFID transponders. In some embodiments, the RFID transponder 180 uses the electromagnetic energy transmitted, e.g., an interrogating signal, by the first antenna 160 for its energy source.

The first RFID transponder 180 has the ability to transmit first RFID transponder specific information, such as an individual serial number or information coded to authenticate the identity of the first RFID transponder 180. Since some RFID transponders have individual serial numbers or other authenticating information, in some embodiments, the RFID system 120 discriminates between several RFID transponders that might be within the range of the RFID reader and in some embodiments reads them substantially simultaneously and/or continuously. In some embodiments, the first RFID transponder specific information is an echo of some or all of an interrogator signal; data written into the RFID transponder 180; and/or a product kind.

In some embodiments, the reader 140, first antenna 160, and first RFID transponder 180 work in a frequency band ranging from 120 kHz to 10 GHz. In some embodiments, the range is from 120 to 150 kHz or from 865 to 868 MHz or from 902 to 928 MHz or from 2450 to 5800 MHz or from 3.1 to 10 GHz. For example, in some embodiments, the reader 140, first antenna 160, and first RFID transponder 180 work in a frequency band approximately centered about 13.56 MHz or 433 MHz.

The first RFID transponder 180 and the first antenna 160 are fixed relative to the path and on opposite sides of the path. In some embodiments, first antenna 160 and first RFID transponder 180 are separated by a distance ranging from about 0.1 to 200 meter (m). In some embodiments, the distance ranges from 0.1 to 2 m or from 1 to 2 m or from 2 to 10 m. In some embodiments, the first RFID transponder 180 and the first antenna 160 are on opposite sides of one or more guideways 100. In some embodiments, the connecting path between the first antenna 160 and the first RFID transponder 180 slopes vertically above the guideway 100, or is perpendicular to the guideway 100.

In some embodiments, the first antenna 160 and first RFID transponder 180 are independently fixed on or in a structure associated with or in close proximity to the guideway structure. For example, in some embodiments, first antenna 160 and first RFID transponder 180 are independently fixed on a guideway (not necessarily a load bearing guideway), a sleeper (railroad ties); a mounting structure associated with a ballast or a mounting structure associated with a cess. In some embodiments, the mounting structure associated with a ballast or cess is embedded in the ballast and/or cess. Such mounting structures are chosen from walls, poles, free-standing structures, and containers. In some embodiments, the first antenna 160 and first RFID transponder 180 are embedded in a wall, pole, free-standing structure, or container. "Fixed" RFID transponders and/or antennas exclude embodiments, e.g., in which the first RFID transponder 180 is fixed on or in a guideway guided vehicle temporarily stopped or parked in the vicinity of the antenna 160.

The first antenna 160 and the first RFID transponder 180 are configured to allow the masking component of the guideway-guided vehicle to pass between them. For example, in some embodiments, the first antenna 160 and the first RFID transponder 180 are separated in a horizontal plane along or parallel to or parallel to the path, i.e., configured to be side-by-side of the masking component of the guideway-guided vehicle. For example, in some embodiments, the first antenna 160 and the first RFID transponder 180 are separated in a vertical plane to the path, i.e., configured to be above and/or below the masking component of the guideway-guided vehicle.

Once initiated, the RFID reader 140 is configured to substantially continuously monitor the first transponder specific information. Such monitoring allows detecting the absence of the masking component of the guideway-guided vehicle, which indicates that the masking component of the guideway-guided vehicle is not at the position on the path between the first antenna 160 and the first RFID transponder 180. On the other hand, the presence of the masking component of the guideway-guided vehicle between the first RFID transponder and the first antenna masks the substantially continuous monitoring of the first RFID transponder specific information, which indicates that the masking component of the guideway-guided vehicle is at the position on the path between the first antenna 160 and the first RFID transponder 180.

In some embodiments, the masking component of the guideway-guided vehicle is sufficient to reflect and/or scatter and/or absorb the signal bearing the first RFID transponder specific information. In some embodiments, the masking component of the guideway-guided vehicle is sufficient to interfere with the ability of the first antenna 160 to detect the signal bearing the RFID transponder specific information. In some embodiments, the masking component of the guideway-guided vehicle is a load-bearing part of the guideway-guided vehicle. In some embodiments, the masking component of the guideway-guided vehicle is a non-load bearing part of the guideway-guided vehicle. In some embodiments, the guideway-guided vehicle is selected from locomotives, railroad cars, rail cars, coaches, and bogies. In some embodiments, masking components are selected from the under carriages of, sidewalls of, wheels of, or flaps on the guideway-guided vehicles.

In some embodiments, the RFID system 120 is configured to determine the time when a guideway-guided vehicle traverses between the first RFID transponder 180 and the first antenna 160.

In some embodiments, the guideway-guided vehicle is part of a group of two or more guideway-guided vehicles. In some embodiments, all members of the group guideway-guided vehicles have a masking component. In some embodiments, two or more members of the group guideway-guided vehicles have a masking component. For example, the first and last member of the group of guideway-guided vehicles have the masking component or every nth member (n=2, 3, . . . etc.) of an m member (m≥2×n) group of guideway-guided vehicles have the masking component. In such cases, the overall length of the group is determinable from knowledge about the frequency or pattern of guideway-guided vehicles having the masking components. As such, in some embodiments, the RFID system 120 is configured to determine the number of guideway-guided vehicles traversing between the first RFID transponder and the first antenna. Further knowledge about the dimension of the guideway-guided vehicles makes it possible to determine the length of guideway 100 that is occupied by the at least one guideway-guided vehicle. As such, in some embodiments, the RFID system 120 is configured to determine the occupancy of the one or more guideway-guided vehicles on the guideway 100.

In some embodiments, the RFID system 120 is configured to determine the time when two or more guideway-guided vehicle traverse between the first RFID transponder 180 and the first antenna 160.

Figure 2:
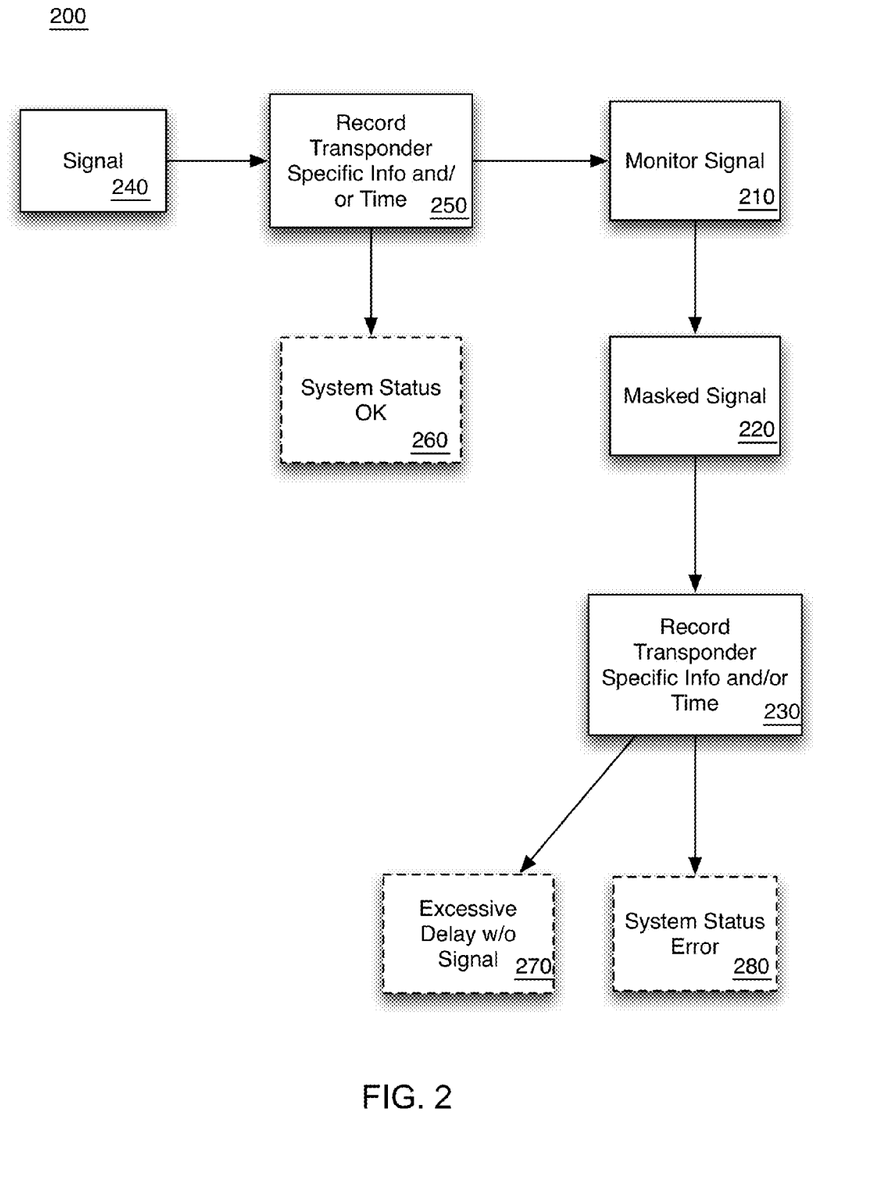
FIG. 2 illustrates a process flow diagram of some embodiments of an apparatus for detecting the information about a guideway-guided vehicle in use.

In some embodiments, the apparatus in use is illustratable by reference to FIG. 2, which represents a process flow diagram of an apparatus for detecting the information about a guideway-guided vehicle in use. As noted above, the RFID system substantially continuously monitors a signal bearing the first transponder specific information 210. Such monitoring allows detecting the absence of the masking component of the guideway-guided vehicle, which indicates that the position is unoccupied, i.e., the masking component of the guideway-guided vehicle is not at the position on the path between the first antenna 160 and the first RFID transponder 180.

The signal bearing the first transponder specific information is eventually masked 220. At this time, it is possible to record the transponder specific information and optionally the time 230. Typically a masked signal 230 indicates that the position is occupied, i.e., the masking component of the guideway-guided vehicle is at the position on the path between the first antenna 160 and the first RFID transponder 180.

The signal bearing the first transponder specific information eventually returns 240. At this time, it is possible to record the transponder specific information and optionally the time 250. The RFID system thereafter substantially continuously monitors a signal bearing the first transponder specific information 210, which indicates that the system status is working, which status is optionally recordable 260.

Optionally, the system is configured to respond to an excessive delay in the time period 270 between when the signal is masked 220 and when the signal returns 240. For example, if the signal return 240 is delayed for an unexpected period of time, which in some embodiments ranges from 1-120 seconds or from 10-30 seconds or some other period of time much longer that it would take for the masking component to traverse the position, then it is possible to optionally record a system status error 280.

Having knowledge about the time and distance between two or more guideway-guided vehicles allows one to determine kinetic parameters like speed. For example, in some embodiments, the RFID system 120 is configured to estimate the speed of the guideway-guided vehicles traversing between the first RFID transponder 180 and the first antenna 160 based on the time period between when two or more guideway-guided vehicle traverse between the first RFID transponder 180 and the first antenna 160.

In some embodiments, the RFID system 120 is configured to communicate information to a processor (not shown). In some embodiments, the communication is wireless. In some embodiments, the communication is wired. In some embodiments, the processor is a zone controller.

In some embodiments, the information is chosen from the absence of a guideway-guided vehicle between the first RFID transponder 180 and the first antenna 160; the presence of a guideway-guided vehicle between the first RFID transponder 180 and the first antenna 160; the time when at least one guideway-guided vehicle passes between the first RFID transponder 180 and the first antenna 160; the number of guideway-guided vehicles passing between the first RFID transponder 180 and the first antenna 160 for a time period; kinetic information (including speed and the like) regarding at least one guideway-guided vehicle passing between the first RFID transponder 180 and the first antenna 160 for a time period; the occupancy on the guideway 100 of the at least one guideway-guided vehicle passing between the first RFID transponder 180 and the first antenna 160 for a time period, and the system status.

In some embodiments, the RFID system 110 further comprises an additional RFID transponder and optionally an additional antenna. In such embodiments, additional information about the guideway-guided vehicle is obtainable.

Figure 3:
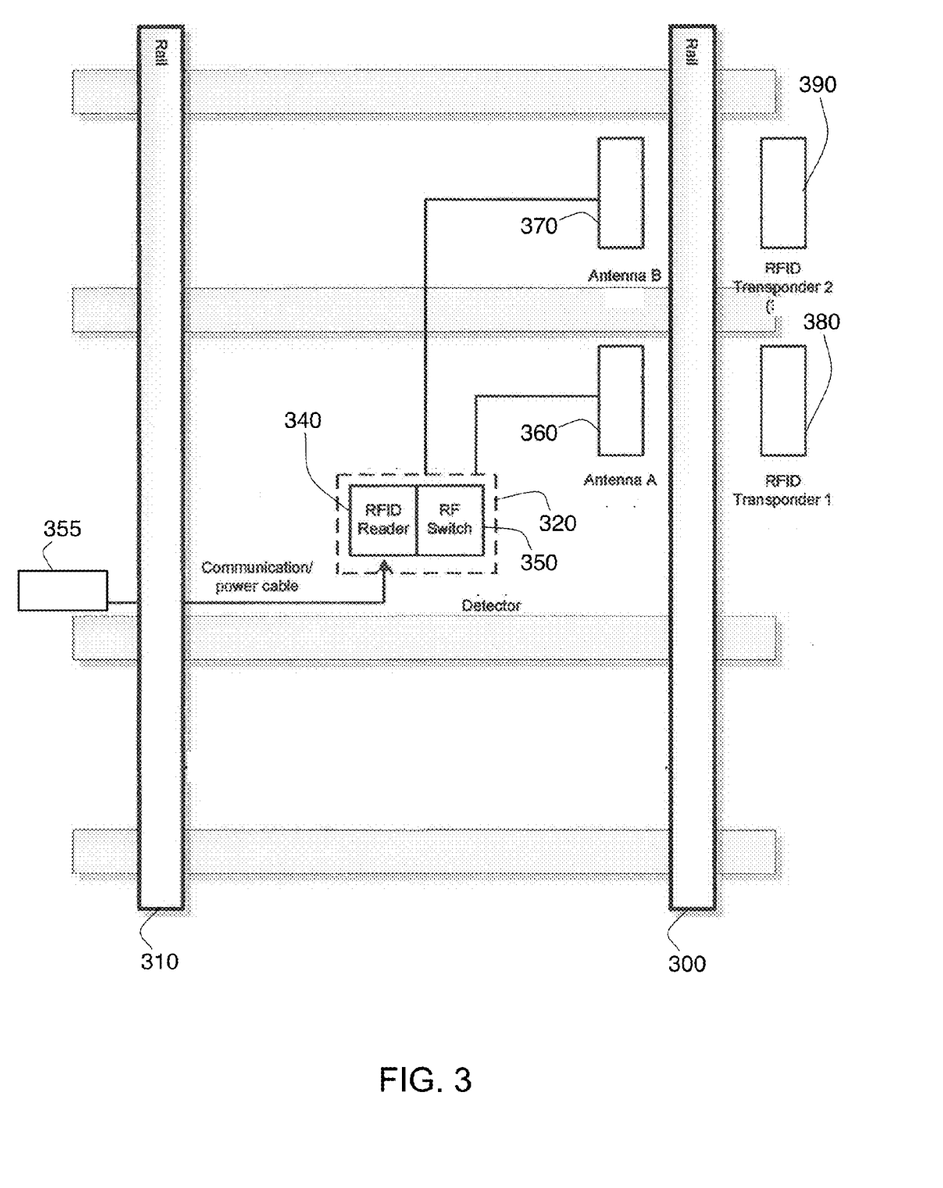
FIG. 3 is a top view of an apparatus for detecting the information about a guideway-guided vehicle.

In some embodiments, the invention is illustratable by reference to FIG. 3, which depicts an apparatus for detecting the information about a guideway-guided vehicle having a masking component. A guideway 300 separates some of the RFID system 320. In some embodiments, guideways 300,310 separate some of the RFID system 320. In some embodiments, no guideways 300,310 separate the RFID system 320, such as in a vertical arrangement of an antenna-transponder pair.

In FIG. 3, the RFID system 320 comprises an RFID reader 340, a first antenna 360 for receiving the first RFID transponder specific information, and a second antenna 370 for receiving the second RFID transponder specific information. The RFID system 320 comprises not only a first RFID transponder 380 for transmitting, across the path, first RFID transponder specific information but the RFID system 320 further comprises a second RFID transponder 390 for transmitting, across the path, second RFID transponder specific information. The first RFID transponder 380 and the first antenna 360 are fixed relative to the path and on opposite sides of the path. The second RFID transponder 390 and the second antenna 370 are fixed relative to the path and on opposite sides of the path. The RFID reader 340 is configured to substantially continuously monitor both the first transponder specific information from the first RFID transponder 380 and the second transponder specific information from the second RFID transponder 390. The presence of the masking component of the guideway-guided vehicle between the first RFID transponder 380 and the first antenna 360 masks the substantially continuous monitoring of the first RFID transponder specific information, and the presence of the masking component of the guideway-guided vehicle between the second RFID transponder 390 and the second antenna 370 masks the substantially continuous monitoring of the second RFID transponder specific information.

An additional antenna-transponder pair makes it possible to provide a safeguard should the first fail. The additional antenna-transponder pair operates in an analogous manner to the first antenna-transponder pair.

As noted above, monitoring allows detecting the presence or absence of the masking component of the guideway-guided vehicle, which indicates that the masking component of the guideway-guided vehicle is or is not at the position on the path between the first antenna 360 and the first RFID transponder 380 and/or the second antenna 370 and the second RFID transponder 390.

In some embodiments, the first RFID transponder 380 is separated from the second RFID transponder 390 by a distance, along or parallel to the path, such that the masking component of the guideway-guided vehicle is at the position on the path between the first antenna 360 and the first RFID transponder 380 but not at the position on the path between the second antenna 370 and the second RFID transponder 390 and vice versa. In some embodiments, the first RFID transponder 380 is separated from the second RFID transponder 390 by a distance, along or parallel to the path, of at least 1 m. In some embodiments, the distance ranges from 1 to 30 m or from 2 to 20 m or 10 to 15 m or from 3 to 5 m.

In some embodiments, as in FIG. 3, the RFID system 320 further comprises a switch 350 configured to alternate monitoring between the first transponder specific information via the first antenna 360 and the second transponder specific information via the second antenna 370. Notwithstanding the alternating, the monitoring is substantially continuous. In some embodiments, the monitoring between the first transponder specific information via the first antenna 360 and the second transponder specific information via the second antenna 370 alternates at symmetric periods. In some embodiments, the monitoring between the first transponder specific information via the first antenna 360 and the second transponder specific information via the second antenna 370 alternates at asymmetric periods. In some embodiments, switching period is random.

In accordance with at least some embodiments, by continuous alternating of the reading of the first transponder and the second transponder via the RF switch and the first and second antenna, the health status of the system is continually verified and dormant failures detected. As such the apparatus is able to achieve a Safety Integrity Level (SIL) 4 as no dormant failures of the system remain undetected. SIL 4 is based on International Electrotechnical Commission's (IEC) standard IEC 61508, in at least one embodiment. SIL level 4 means the probability of failure per hour ranges from $10^{-8}$ to $10^{-9}$.

In at least some embodiments, RFID system 320 controls switch 350 to alternate according to a predetermined alternation pattern between monitoring first antenna 360 and second antenna 370. In at least some embodiments, the predetermined alternation pattern allocates monitoring of antennas according to a round robin scheduling pattern. In at least some embodiments, the predetermined alternation pattern allocates monitoring of antenna according to a random distribution scheduling pattern. In at least some embodiments, the predetermined alternation pattern allocates monitoring of antenna according to an unbalanced distribution pattern in which one antenna is monitored more frequently than another antenna. In at least some embodiments, more antennas are used in conjunction with RFID system 320 and the predetermined alternation pattern is applied to the antennas used. In at least some embodiments, more antennas are used in conjunction with RFID system 320 and the predetermined alternation pattern is applied to a subset of the antennas used. In at least one embodiment, the switch 350 alternates between monitoring the first antenna 360 and second antenna 370 according to a given pattern of A, B, B, A, B, A, A, B, A, B, B, A . . . in which A corresponds to a period of monitoring the first antenna 360 and B corresponds to a period of monitoring the second antenna 370.

For example, each transponder-antenna pair works in a manner previously explained in reference to FIGS. 1-2. Referring to FIG. 2, if "1" indicates a signal (unmasked) and "0" indicates a masked signal, then there are four possible states for the first transponder-antenna pair ("T1") and the second transponder-antenna pair (T2).

TABLE 1

Transponder states

| T1 | T2 | |
|---|---|---|
| 1 | 1 | indicates an absence of a masking component at positions of T1-T2 |
| 0 | 1 | presence at T1, absence at T2 |
| 1 | 0 | absence at T1, presence at T2 |
| 0 | 0 | presence at T1-T2, possible in some embodiments, but not this one |

More transponder-antenna pairs are possible in some embodiments.

In at least a given embodiment, use of a single RF switch (as in switch 350 of FIG. 3) enables functionality related to a self checking mechanism for determining fail safe or vitality of the system. In accordance with the given embodiment, RFID reader 340 receives the transponder specific information from the corresponding antenna 360, 370 via RF switch 350 in accordance with the predetermined alternation pattern of monitoring. RF Switch 350 alternates between continuously alternating monitoring first antenna 360 and second antenna 370. In this manner, transponder specific information received by RFID reader 340 is not older than the last alternation of monitoring performed by RF switch 350. RFID reader 340 does not receive stale information or data (i.e., older than the last received information or data) from switch 350 regarding a monitored antenna. In at least some embodiments, the received transponder specific information includes time and/or date stamp information indicating a time and/or date related to the generation and/or transmission of the transponder specific information.

In accordance with the given embodiment, RFID system 320 is able to verify fail safe operation of the Apparatus by comparing the changing received transponder specific information from switch 350 due to the predetermined alternation pattern of monitoring. That is, because switch 350 alternates between monitoring first antenna 360 and the first transponder 380 and second antenna 370 and the second transponder 370, the data transmitted from switch 350 to RFID reader 340 changes in accordance with the alternation of monitoring. If the data received by RFID reader 340 does not change, then RFID system 320 is able to determine that a failure has occurred, in at least some embodiments.

Continuing with the given embodiment, a vehicle moving on the guideway 300 from the bottom of the page upward first encounters first antenna 360 paired with first transponder 380 and a masking component of the vehicle interrupts the path between the pair preventing switch 350 from receiving transponder specific information from first antenna 360. However, the path between the second antenna 370 and second transponder 390 is uninterrupted by the vehicle and switch 350 receives transponder specific information from second antenna 370 during the period in which the switch monitors the second antenna. During this period (where the path between 360 and 380 is interrupted), system 320 is able to determine that second antenna 370 is operating normally and that first antenna 360 is not providing transponder specific information which is indicative of either a failure of first antenna 360 or a vehicle on guideway 300 interrupting the path between the first antenna and the first transponder. After the vehicle transitions beyond interrupting the path between first antenna 360 and first transponder 380, switch 350 receives transponder specific information which indicates that the first antenna is operating normally.

After the vehicle transitions further up the guideway 300 (further up the page), the vehicle encounters second antenna 370 paired with second transponder 390 and the masking component of the vehicle interrupts the path between the pair preventing switch 350 from receiving transponder specific information from the second antenna. However, as in the above period during blockage of the path between the second antenna and second transponder, the path between the first antenna 360 and first transponder 380 is uninterrupted by the vehicle and switch 350 receives transponder specific information from first antenna 360 during the period in which the switch monitors the first antenna. During this period, system 320 is able to determine that first antenna 360 is operating normally and that second antenna 370 is not providing transponder specific information which is indicative of either a failure of second antenna 370 or a vehicle on guideway 300 interrupting the path between the second antenna and the second transponder. After the vehicle transitions beyond interrupting the path between second antenna 370 and second transponder 390, switch 350 receives transponder specific information which indicates that the second antenna is operating normally. In this manner, fail safe SIL 4 operation of the system is ensured, in at least some embodiments.

In at least some embodiments, a predetermined timeout period is used to determine whether an interruption of a path between a transponder-antenna pair is indicative of a failure of the system. If the path is interrupted for a time period greater than the predetermined timeout period, a system failure is determined to have occurred and an alert or other indication is generated. In at least some embodiments, the indication is transmitted to a system communicably connected with system 320. In at least some embodiments, the indication is stored local to system 320.

Additionally, in at least some embodiments, use of a single switch 350 reduces the overall cost of the system in addition to the foregoing advantages.

In some embodiments, the RFID system 320 is configured to determine the direction of travel of the guideway-guided vehicle based on the order in which (a) the substantially continuous monitoring of the first RFID transponder specific information is masked and (b) the substantially continuous monitoring of the second RFID transponder specific information is masked. In this case, the guideway-guided vehicle is traveling in the direction in which the masking occurs. For example, assume masking occurs in the following order in time (t=time, arbitrary units).

TABLE 2

Transponder states as a function of increasing time.

| t | T1 | T2 | |
|---|----|----|---|
| 1 | 1  | 1  | absence at positions of T1-T2 |
| 2 | 0  | 1  | presence at T1, absence at T2 |
| 3 | 1  | 0  | absence at T1, presence at T2 |

Based on the data in Table 2, the guideway-guided vehicle is moving from the position of T1 towards the position of T2.

For example, if the first RFID transponder 380 is separated from the second RFID transponder 390 by a distance, along or parallel to the path, such that the masking component of the guideway-guided vehicle is at the position on the path between the first antenna 360 and the first RFID transponder 380 but not at the position on the path between the second antenna 370 and the second RFID transponder 390, then the RFID system 320 has the ability to self-check and to determine additional information regarding the one or more guideway-guided vehicles. Referring to Table 1, although the 0,0 embodiment (T1,T2) is possible in some embodiments, in some embodiments like this one, the 0,0 state is not allowed by the relative fixed positions of the first and second transponder-antenna pairs. In this embodiment, if this state were to occur, then the system would be in error, such as a power outage. Such system status is recordable.

Figure 4:
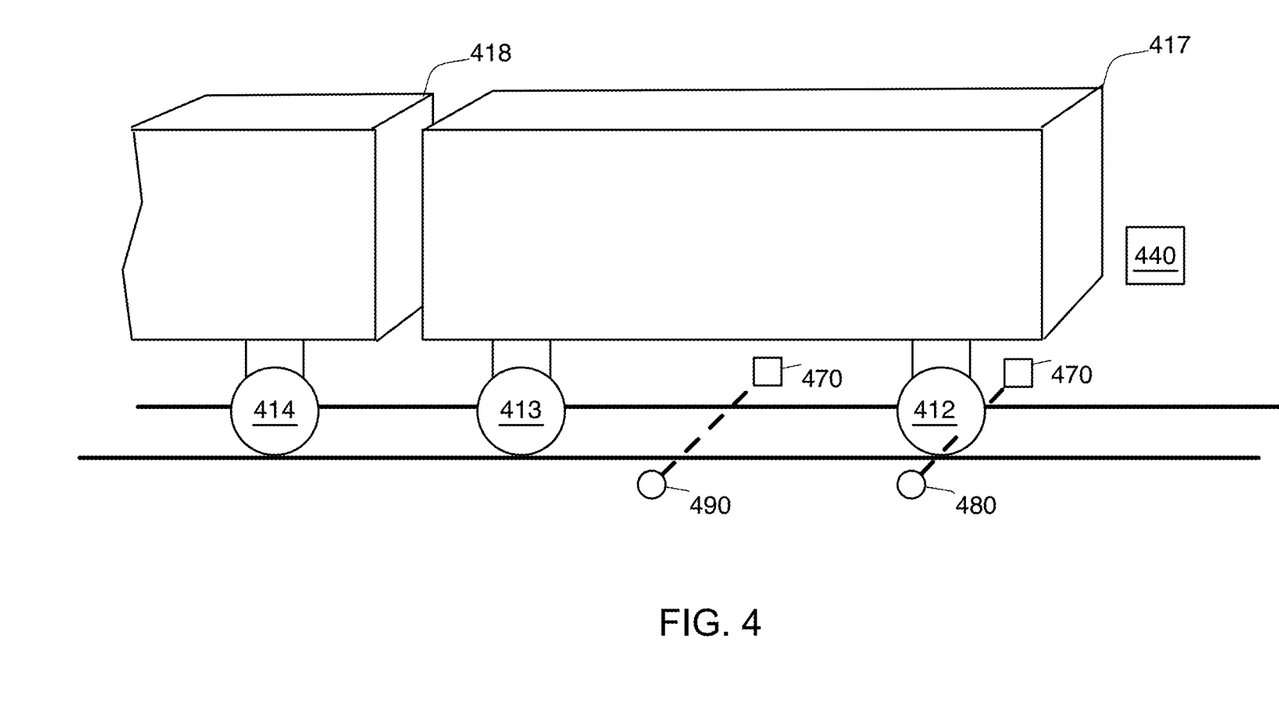
FIG. 4 is a side view of an apparatus for detecting the information about a guideway-guided vehicle.

An example of such an embodiment is illustratable in FIG. 4, which depicts an apparatus for detecting the information about a coach 417 or 418 having a masking component 412 or 413 or 414. In this embodiment, the masking components 412-414 correspond to the wheels of the coach 417 or 418. Guideways 400,410 define a path for the coaches 417 & 418 and separate some of the RFID system 420, which comprises RFID reader 440 in communication with a first antenna 460 and a second antenna 470 (outside the guideways 400,410 and on the side with guideway 410), a first transponder 480, and a second transponder 490 (outside the guideways 400, 410 on side with guideway 400). The first transponder 480 and a second transponder 490 are fixed at a position such that the masking components 412-414 of the boxcars 417-418 are at the position on the path between the first antenna 460 and the first RFID transponder 480 but not at the position on the path between the second antenna 470 and the second RFID transponder 490. Referring to Table 1, although the 0,0 embodiment (T1,T2) is possible in some embodiments, in this embodiment, the 0,0 state is not allowed by the relative fixed positions of the first and second transponder-antenna pairs. In this embodiment, if the 0,0-state were to occur, then the system would be in error and determinable by if . . . then logic testing. Such a system status is recordable.

With reference to FIG. 3, in some embodiments, the RFID system 320 is configured to determine the system status based on (a) the substantially continuous monitoring of the first RFID transponder specific information and (b) the substantially continuous monitoring of the second RFID transponder specific information. For example, if the masking component of the guideway-guided vehicle is at the position on the path between the first antenna 360 and the first RFID transponder 380, the monitoring is configured to determine whether or not the masking component of the guideway-guided vehicle thereafter arrives at the position on the path between the second antenna 370 and the second RFID transponder 390 within a false positive monitoring period. If the false monitoring period ends without masking at the position on the path between the second antenna 370 and the second RFID transponder 390, then the RFID system 320 is configured to make a false positive determination. In this way, e.g., the RFID system 320 has the ability to self-check its status. Such a status is recordable.

The false positive monitoring period is of a sufficient duration for the guideway-guided vehicle to traverse the distance of separation along or parallel to the path between the first RFID transponder 380 and the second RFID transponder 390. In some embodiments, the false positive monitoring period depends on one or more of several factors such as the separation distance, the speed of the guideway-guided vehicles, and the like. In some embodiments, the false positive monitoring period ranges from 1-120 seconds or from 10-30 seconds.

In some embodiments, the apparatus is self-checking, allowing for the detection of failures and/or is not connected to the guideway thus decreasing problems associated with EMI/EMC (electromagnetic interference/electromagnetic compatibility) that a system connected to the guideway would experience.

In some embodiments, the RFID system 320 is configured to communicate information with a processor 355. In some embodiments, the communication is wireless. In some embodiments, the communication is wired. In some embodiments, the processor is a zone controller. The processor noted herein is useable with any embodiment, including those associated with FIG. 3.

Figure 7:
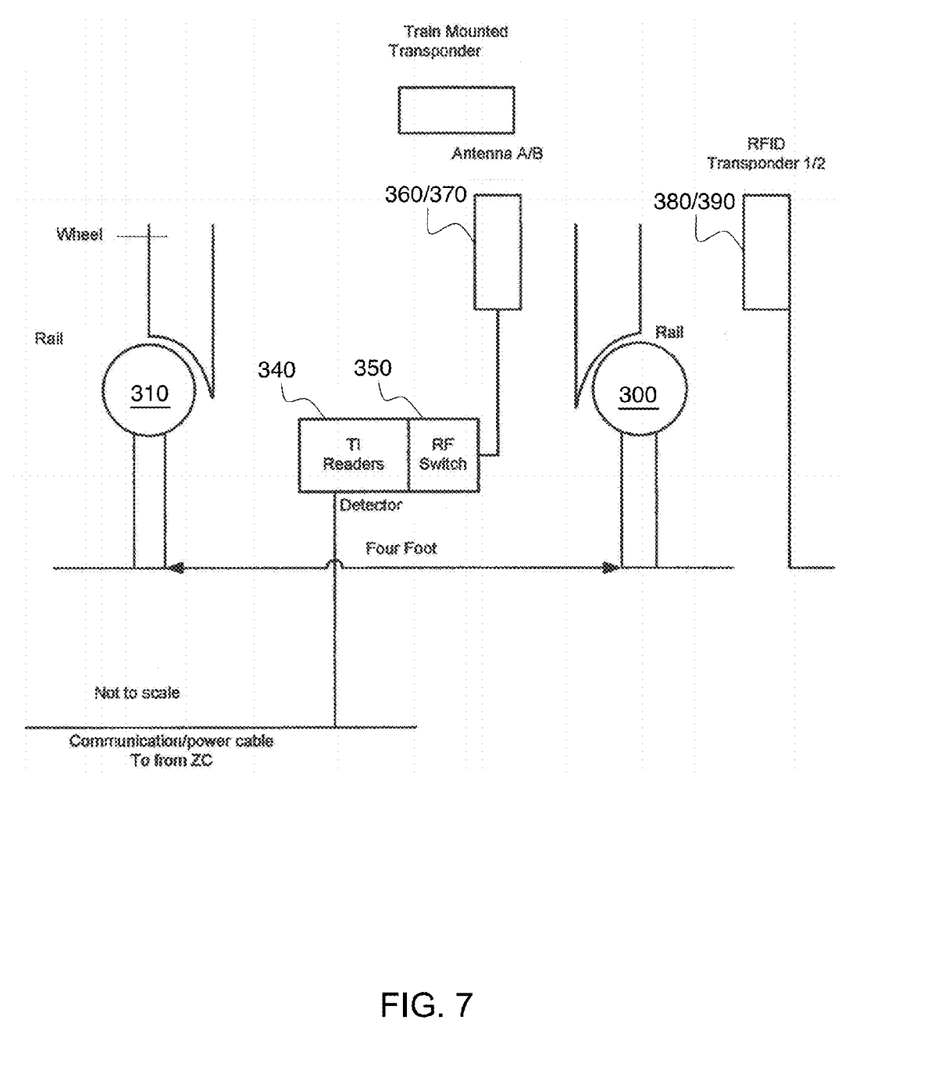
FIG. 7 is a side cross-section view of an embodiment.

FIG. 7 is a side cross-section view of the FIG. 3 embodiment. RFID reader 340 is communicatively connected with RF switch 350. RF switch 350 is communicatively connected with first and second antennas 360, 370. First and second antennas 360/370 are in communication with a corresponding first and second transponder 380, 390.

In some embodiments, the information is chosen from the same types of information noted above for the embodiments of FIGS. 1-2. In addition to that information, additional information includes the direction of travel of the guideway-guided vehicle and the system status of the RFID system 320. Because position and direction are determinable, more kinetic information is determinable, e.g., the velocity and the like of the guideway-guided vehicle.

Figure 5:
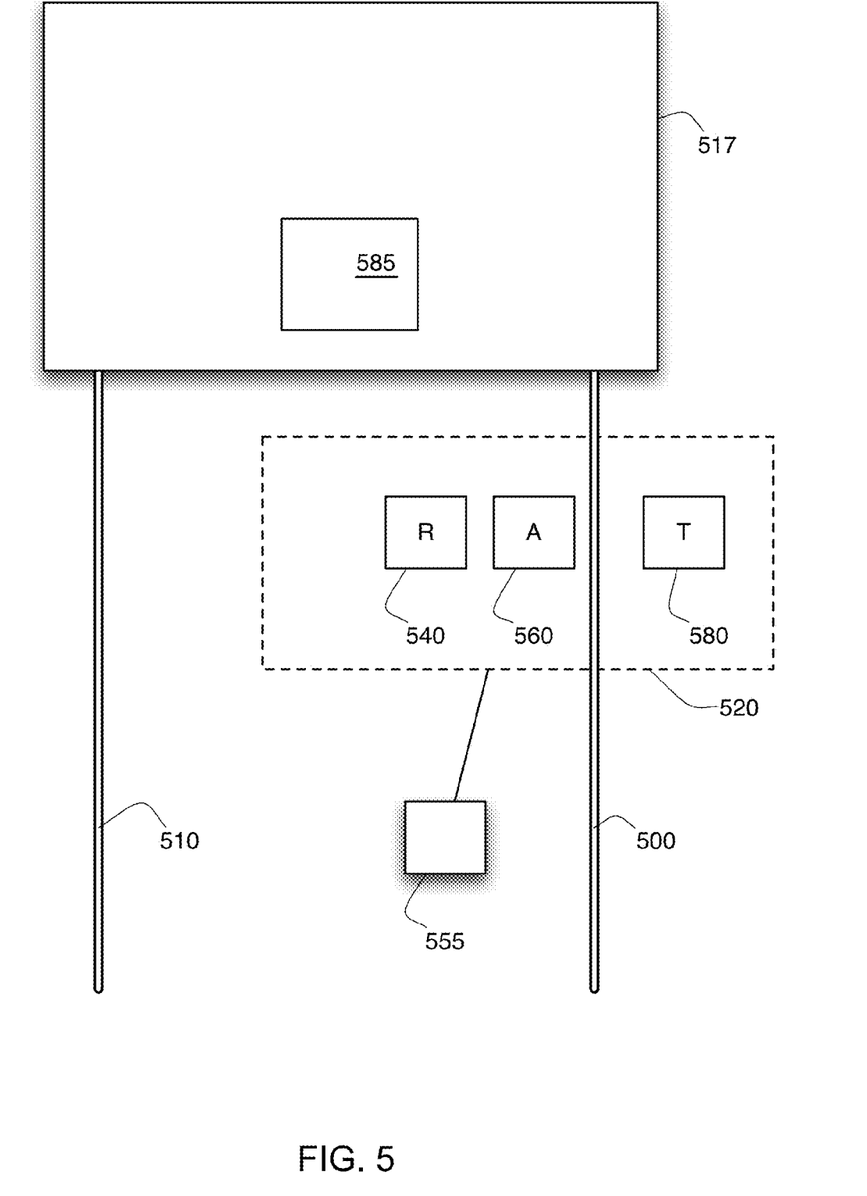
FIG. 5 is a top view an apparatus for detecting the information about a guideway-guided vehicle.

In some embodiments, the invention is illustratable by reference to FIG. 5, which depicts an apparatus for detecting the information about a guideway-guided vehicle 517 having a masking component (not shown). Guideways 500,510 guide the guideway-guided vehicle 517. A guideway 500 separates some components of the RFID system 520. The RFID system 520 comprises an RFID reader 540, a first antenna 560 for receiving the first RFID transponder specific information and optionally (not shown) a second antenna for receiving the second RFID transponder specific information. The RFID system 520 comprises a first RFID transponder 580 for transmitting, across the path, first RFID transponder specific information and optionally (not shown) a second RFID transponder for transmitting, across the path, second RFID transponder specific information. The first RFID transponder 580 and the first antenna 560 are fixed relative to the path and on opposite sides of the path, and the optional (not shown) second RFID transponder and the second antenna are fixed relative to the path and on opposite sides of the path as noted above. The RFID reader 540 is configured to substantially continuously monitor the first transponder specific information from the first RFID transponder 580 and optionally the second transponder specific information from the second RFID transponder as noted above. The presence of the masking component of the guideway-guided vehicle between the first RFID transponder 580 and the first antenna 560 masks the substantially continuous monitoring of the first RFID transponder specific information, and optionally (not shown) the presence of the masking component of the guideway-guided vehicle between the second RFID transponder and the second antenna masks the substantially continuous monitoring of the second RFID transponder specific information.

In FIG. 5, the RFID system 520 further comprises a switch 550 configured to alternate monitoring between the first transponder specific information via the first antenna 560 and optionally (not shown and when present) the second transponder specific information via the second antenna. The apparatus works like the one described with reference to FIGS. 1-4.

In FIG. 5, the RFID system 520 is configured to receive mounted RFID transponder specific information from a guideway-guided vehicle having a mounted RFID transponder 585 for transmitting the mounted RFID transponder specific information. The mounted RFID transponder 585 is any RFID transponder, such as those mentioned above. In some embodiments, the mounted RFID transponder 585 is configured to transmit the mounted RFID transponder specific information concerning the identity of the guideway-guided vehicle on which the mounted RFID transponder is mounted. The mounted RFID transponder 585 is mountable in suitable locations of the guideway-guided vehicle 517, and in some embodiments is mounted on the axles of the wheels, on the containment structure, or in the compartment of the guideway-guided vehicle 517.

In some embodiments, the RFID system 520 is configured to communicate information with a processor 555, such as a zone control center. The information includes, in some embodiments, the mounted RFID transponder specific information, e.g., concerning the identity of the guideway-guided vehicle on which the mounted RFID transponder is mounted.

Of course, the embodiments of FIG. 5 would work with embodiments having a single pair antenna-transponder and embodiments having multiple pairs of antennas-transponders. Of course, the embodiments of FIG. 5 would also work with other embodiments disclosed herein.

In some embodiments, the apparatus not only vitally detects the guideway-guided vehicle entering/exiting the guideway section but it also determines, e.g., the identity of the guideway-guided vehicle entering/exiting the guideway section by reading the mounted RFID transponder 585.

In some embodiments, the apparatus make it possible to detect vital information regarding the guideway-guided vehicle using non-vital RFID equipment.

In some embodiments, the apparatus make it possible to detect signals suitable for railway signaling for guideway-guided vehicle detection system.

In some embodiments, the apparatus make it possible to detect safety-critical absence detection of metallic or non-metallic objects associated with a detectable guideway-guided vehicle.

In some embodiments, a method of detecting information about a guideway-guided vehicle having a masking component is provided. Any transponder specific information disclosed herein is detectable. The following provides examples of various embodiments.

In some embodiments, the guideway-guided vehicle is configured to follow a path of a guideway. In some embodiments, the method substantially continuously monitors, with a first antenna connected to or in communication with a first RFID reader, first transponder specific information transmitted from a first RFID transponder. As noted above, the presence of the masking component of the guideway-guided vehicle between the first RFID transponder and the first antenna masks the substantially continuous monitoring of the first RFID transponder specific information. Also, as noted above, the first RFID transponder and the first antenna are fixed relative to the path and on opposite sides of the path.

In some embodiments, a second antenna and a second transponder are useable. For example, in some embodiments, the method further comprises substantially continuously monitoring, with a second antenna connected to or in communication with an RFID reader, second transponder specific information transmitted from a second RFID transponder. Again, the presence of the masking component of the guideway-guided vehicle between the second RFID transponder and the second antenna masks the substantially continuous monitoring of the second RFID transponder specific information. Also, the second RFID transponder and the second antenna are fixed relative to the path and on opposite sides of the path.

As noted above, in some embodiments the first RFID transponder is separated from the second RFID transponder by a distance, along or parallel to the path, such that the presence of the masking component of the guideway-guided vehicle between the first RFID transponder and the first antenna sufficient to mask the substantially continuous monitoring of the first RFID transponder specific information does not occur at the same time of masking the substantially continuous monitoring of the second RFID transponder specific information.

In some embodiments, substantially continuous monitoring of the first transponder specific information alternates with the substantially continuous monitoring the second transponder specific information.

In some embodiments, the method further comprises determining the direction of travel of the guideway-guided vehicle based on the order in time in which (a) the substantially continuous monitoring of the first RFID transponder specific information is masked and (b) the substantially continuous monitoring of the second RFID transponder specific information is masked.

In some embodiments, the method further comprises determining the system status based on the time in which (a) the substantially continuous monitoring of the first RFID transponder specific information is masked and the time in which (b) the substantially continuous monitoring of the second RFID transponder specific information is masked.

In some embodiments, the method further comprising monitoring, with the antenna connected to or in communication with the first RFID reader, mounted RFID transponder specific information from a guideway-guided vehicle having a mounted RFID transponder.

In some embodiments, the method further comprises communicating the information to a processor.

Figure 6:
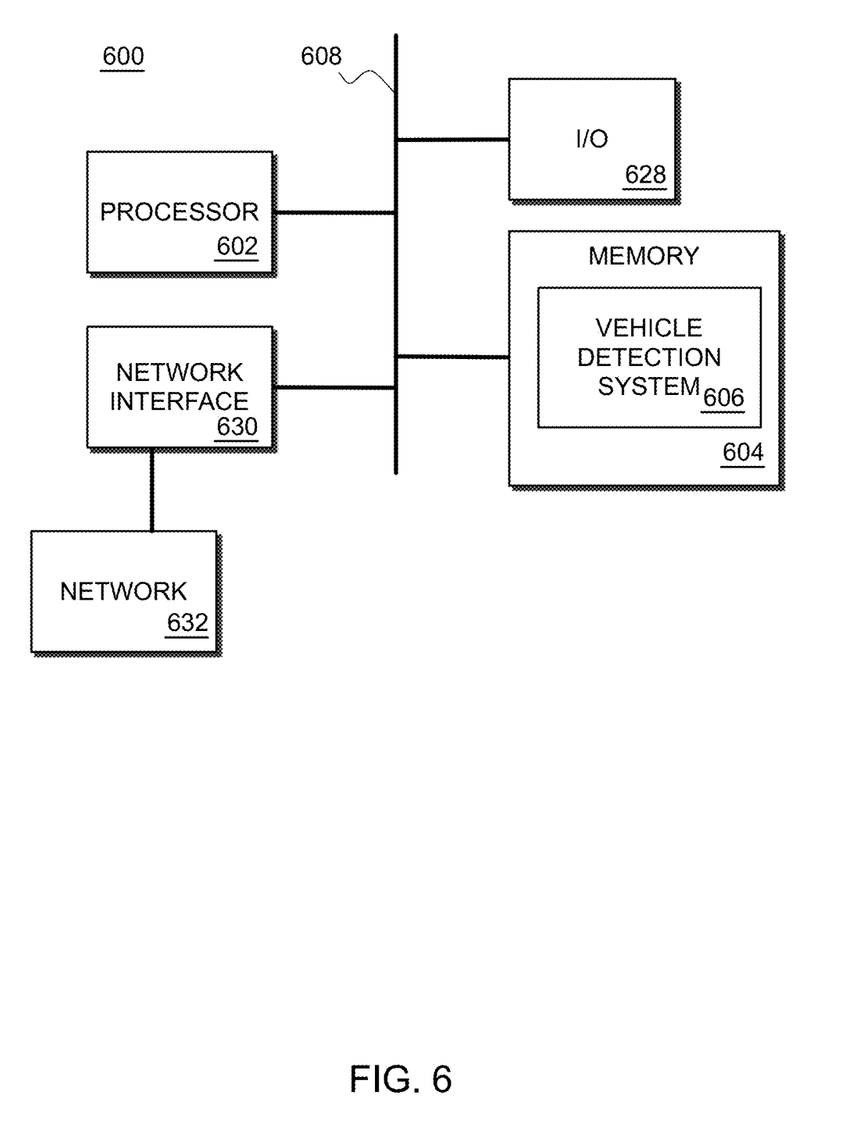
FIG. 6 is a functional block diagram of a controller system.

FIG. 6 is a block diagram of a controller system 600 usable for implementing a method associated with the apparatus, such as those associated with FIGS. 1-5 and other embodiments vide infra, in accordance with one or more embodiments. In at least some embodiments, system 600 is usable as at least a portion of reader 140 (FIG. 1). System 600 includes a hardware processor 602 and a non-transitory, computer readable storage medium 604 encoded with, i.e., storing, the computer program code 606, i.e., a set of executable instructions. The processor 602 is electrically coupled to the computer readable storage medium 604 via a bus 608 or other suitable mechanism. The processor 602 is configured to execute the computer program code 606 encoded in the computer readable storage medium 604 in order to cause system 600 to be usable for performing a portion or all of the operations as depicted in relation to the uses of the apparatus disclosed herein, including those in FIGS. 1-5.

In some embodiments, the processor 602 is a central processing unit (CPU), a multi-processor, a distributed processing system, an application specific integrated circuit (ASIC), and/or a suitable processing unit.

In some embodiments, the computer readable storage medium 604 is an electronic, magnetic, optical, electromagnetic, infrared, and/or a semiconductor system (or apparatus or device). For example, the computer readable storage medium 604 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 604 includes a compact disk-read only memory (CD-ROM), a compact disk-read/write (CD-R/W), and/or a digital video disc (DVD).

In some embodiments, the storage medium 604 stores the computer program code 606 configured to cause system 600 to perform a method associated with the apparatus disclosed herein, including those associated with FIGS. 1-5. In some embodiments, the storage medium 604 also stores information and/or data needed for performing a method or generated during performing the method, such as temporary variables, lookup tables, and/or a set of executable instructions to perform the operation associated with the disclosed apparatus, including those of FIGS. 1-5.

System 600 includes, in at least some embodiments, an input/output interface 628. The input/output interface 628 is coupled to external circuitry. In at least some embodiments, input/output interface 628 receives data and/or information from antenna 160 (FIG. 1).

In at least some embodiments, system 600 also includes an optional network interface 630 coupled to the processor 602. The network interface 630 allows system 600 to communicate with a network 632, to which one or more other computer systems are connected. Network interface 630 includes wireless network interfaces such as BLUETOOTH, WIFI, WIMAX, GPRS, or WCDMA; or wired network interface such as ETHERNET, USB, or IEEE-1394. In some embodiments, the method associated with the apparatus, including those of FIGS. 1-5 are implemented in two or more system, and information and/or data are exchanged between different systems 600 via the network 632.

System 600 is configured to receive information related to a type of process through I/O 628. The information is transferred to processor 602 via bus 608 to determine at least vehicle detection based on an RFID system.

In some embodiments, a method of making an apparatus for detecting the information about a guideway-guided vehicle having a masking component, the guideway-guided vehicle configured to follow a path of a guideway is provided. Any apparatus disclosed herein is makeable. The following provides examples of various embodiments.

In some embodiments, the apparatus is made by fixing a first RFID transponder and a first antenna relative to the path and on opposite sides of the path. As noted above, the first RFID transponder is for transmitting, across the path, first RFID transponder specific information, the first antenna is configured for receiving the first RFID transponder specific information, the first antenna is connect to a first RFID reader which is configured to substantially continuously monitor the first transponder specific information, and the presence of the masking component of the guideway-guided vehicle between the first RFID transponder and the first antenna masks the substantially continuous monitoring of the first RFID transponder specific information.

In some embodiments, the invention comprises an apparatus for detecting the information about a guideway-guided vehicle having a masking component, a guideway defining a path of the guideway-guided vehicle, comprising an RFID system; wherein the RFID system comprises: a first RFID transponder for transmitting, across the path, first RFID transponder specific information; an RFID reader comprising a first antenna for receiving the first RFID transponder specific information; and wherein the first RFID transponder and the first antenna are fixed relative to the path and on opposite sides of the path; wherein the RFID reader is configured to substantially continuously monitor the first transponder specific information; and wherein the presence of the masking component of the guideway-guided vehicle between the first RFID transponder and the first antenna masks the substantially continuous monitoring of the first RFID transponder specific information.

Other embodiments of the invention will be apparent to those of ordinary skill in the art from consideration of the specification and practice of the invention disclosed herein. It is intended that the specification and examples be considered as exemplary only, with a true scope and spirit of the invention being indicated by the following claims.

What is claimed is:

1. An apparatus for detecting the information about a guideway-guided vehicle having a masking component, the guideway-guided vehicle configured to follow a path of a guideway, comprising a radio frequency identification (RFID) system comprising:
   a first RFID transponder for transmitting, across the path, first RFID transponder specific information;
   an RFID reader having a first antenna for receiving the first RFID transponder specific information; and
   wherein the first RFID transponder and the first antenna are fixed relative to the path and on opposite sides of the path;
   wherein the RFID reader is configured to continuously monitor the first transponder specific information; and
   wherein the presence of the masking component of the guideway-guided vehicle between the first RFID transponder and the first antenna masks the continuous monitoring of the first RFID transponder specific information;
   a second RFID transponder for transmitting, across the path, second RFID transponder specific information; and
   a second antenna for receiving the second RFID transponder specific information; and
   wherein the second RFID transponder and the second antenna are fixed relative to the path and on opposite sides of the path;
   wherein the RFID reader is configured to continuously monitor the second transponder specific information from the second RFID transponder; and
   wherein the presence of the masking component of the guideway-guided vehicle between the second RFID transponder and the second antenna masks the continuous monitoring of the second RFID transponder specific information;
   wherein the first RFID transponder is separated from the second RFID transponder by a distance, along or parallel to the path, such that the presence of the masking component of the guideway-guided vehicle between the first RFID transponder and the first antenna sufficient to mask the continuous monitoring of the first RFID transponder specific information does not occur at the same time of masking the continuous monitoring of the second RFID transponder specific information.

2. The apparatus of claim 1, wherein the first RFID transponder is separated from the second RFID transponder by a distance, along or parallel to the path, of at least 1 meter.

3. The apparatus of claim 1, wherein the RFID system further comprises a RF switch configured to alternate monitoring between the first transponder specific information via the first antenna and the second transponder specific information via the second antenna.

4. The apparatus of claim 3, wherein the RFID system is configured to determine the direction of travel of the guideway-guided vehicle based on the order in which (a) the continuous monitoring of the first RFID transponder specific information is masked and (b) the continuous monitoring of the second RFID transponder specific information is masked.

5. The apparatus of claim 3, wherein the RFID system is configured to determine the system status based on (a) the continuous monitoring of the first RFID transponder specific information and (b) the continuous monitoring of the second RFID transponder specific information.

6. The apparatus of claim 1, wherein the RFID system is configured to determine the time when a guideway-guided vehicle traverses between the first RFID transponder and the first antenna.

7. The apparatus of claim 1, wherein the RFID system is configured to determine the number of guideway-guided vehicles traversing between the first RFID transponder and the first antenna.

8. The apparatus of claim 7, wherein the RFID system is configured to determine the time when two or more guideway-guided vehicles traverse between the first RFID transponder and the first antenna.

9. The apparatus of claim 1, wherein the RFID system is configured to receive mounted RFID transponder specific information from a guideway-guided vehicle having a mounted RFID transponder for transmitting the mounted RFID transponder specific information.

10. The apparatus of claim 1, wherein the RFID system is configured to communicate information with a processor.

11. A method of detecting information about a guideway-guided vehicle having a masking component, the guideway-guided vehicle configured to follow a path of a guideway, the method comprising:
continuously monitoring, with a first antenna connected to or in communication with a first RFID reader, first transponder specific information transmitted from a first RFID transponder;
wherein the presence of the masking component of the guideway-guided vehicle between the first RFID transponder and the first antenna masks the continuous monitoring of the first RFID transponder specific information; and
wherein the first RFID transponder and the first antenna are fixed relative to the path and on opposite sides of the path;
continuously monitoring, with a second antenna connected to or in communication with an RFID reader, second transponder specific information transmitted from a second RFID transponder;
wherein the presence of the masking component of the guideway-guided vehicle between the second RFID transponder and the second antenna masks the continuous monitoring of the second RFID transponder specific information; and
wherein the second RFID transponder and the second antenna are fixed relative to the path and on opposite sides of the path
wherein the first RFID transponder is separated from the second RFID transponder by a distance, along or parallel to the path, such that the presence of the masking component of the guideway-guided vehicle between the first RFID transponder and the first antenna sufficient to mask the continuous monitoring of the first RFID transponder specific information does not occur at the same time of masking the continuous monitoring of the second RFID transponder specific information.

12. The method of claim 11, wherein continuous and alternating monitoring of the first RFID transponder specific information alternates with the continuous monitoring the second RFID transponder specific information allowing for the detection of failures of the system.

13. The method of claim 11, further comprising determining the direction of travel of the guideway-guided vehicle based on the order in time in which (a) the continuous monitoring of the first RFID transponder specific information is masked and (b) the continuous monitoring of the second RFID transponder specific information is masked.

14. The method of claim 11, further comprising determining the system status based on the time in which (a) the continuous monitoring of the first RFID transponder specific information is masked and the time in which (b) the continuous monitoring of the second RFID transponder specific information is masked.

15. The method of claim 11, further comprising monitoring, with the antenna connected to or in communication with the first RFID reader, mounted RFID transponder specific information from a guideway-guided vehicle having a mounted RFID transponder.

16. The method of claim 11, further comprising communicating the information to a processor.

17. A method of making an apparatus for detecting the information about a guideway-guided vehicle having a masking component, the guideway-guided vehicle configured to follow a path of a guideway, comprising:
fixing a first RFID transponder and a first antenna relative to the path and on opposite sides of the path;
wherein the first RFID transponder is for transmitting, across the path, first RFID transponder specific information;
wherein the first antenna is for receiving the first RFID transponder specific information;
wherein the first antenna is connect to a first RFID reader which is configured to continuously monitor the first transponder specific information; and
wherein the presence of the masking component of the guideway-guided vehicle between the first RFID transponder and the first antenna masks the continuous monitoring of the first RFID transponder specific information;
fixing a second RFID transponder and a second antenna relative to the path and on opposite sides of the path;
wherein the second RFID transponder is for transmitting, across the path, second RFID transponder specific information;
wherein the second antenna is for receiving the second RFID transponder specific information;
wherein the second antenna is connect to a second RFID reader which is configured to continuously monitor the second transponder specific information; and
wherein the presence of the masking component of the guideway-guided vehicle between the second RFID transponder and the second antenna masks the continuous monitoring of the second RFID transponder specific information;

wherein the first RFID transponder is separated from the second RFID transponder by a distance, along or parallel to the path, such that the presence of the masking component of the guideway-guided vehicle between the first RFID transponder and the first antenna sufficient to mask the continuous monitoring of the first RFID transponder specific information does not occur at the same time of masking the continuous monitoring of the second RFID transponder specific information.

* * * * *